(12) United States Patent
Taylor et al.

(10) Patent No.: US 9,133,940 B1
(45) Date of Patent: Sep. 15, 2015

(54) UNIDIRECTIONAL LABYRINTH SEAL

(71) Applicants: John Taylor, Hoover, AL (US); Alex F. Farris, III, Birmingham, AL (US)

(72) Inventors: John Taylor, Hoover, AL (US); Alex F. Farris, III, Birmingham, AL (US)

(*) Notice: Subject to any disclaimer, the term of this patent is extended or adjusted under 35 U.S.C. 154(b) by 0 days.

(21) Appl. No.: 14/485,489

(22) Filed: Sep. 12, 2014

(51) Int. Cl.
*B65G 39/00* (2006.01)
*B65G 39/02* (2006.01)
*B65G 39/09* (2006.01)
*F16J 15/447* (2006.01)

(52) U.S. Cl.
CPC .................... *F16J 15/4476* (2013.01)

(58) Field of Classification Search
None
See application file for complete search history.

(56) References Cited

U.S. PATENT DOCUMENTS

| | | |
|---|---|---|
| 6,206,182 B1 | 3/2001 | Wilson et al. |
| 6,641,512 B2 | 11/2003 | Bryant et al. |
| 7,971,882 B1 | 7/2011 | Liang |
| 8,146,733 B2 | 4/2012 | Fox |
| 8,591,116 B2 | 11/2013 | Fedorovich |
| 8,641,288 B2 | 2/2014 | Metten et al. |
| 2006/0147141 A1 | 7/2006 | Harwood et al. |
| 2008/0153683 A1* | 6/2008 | Kirkpatrick et al. ............ 492/16 |

* cited by examiner

*Primary Examiner* — Kavel Singh
(74) *Attorney, Agent, or Firm* — Gerald M. Walsh; Leo Law Firm, LLC

(57) ABSTRACT

A unidirectional annular labyrinth seal having flexible annular fins positioned on a circular plate near an outer edge of the circular plate wherein the fins are biased towards a center of the circular plate. Annular ribs are positioned on an end of an idler roller. The fins project into recesses formed by the annular ribs, thereby forming the unidirectional annular labyrinth seal. The annular fins engage the annular ribs when the temperature of air within an interior of the roller is similar to the temperature of air exterior to the roller, thereby closing the labyrinth seal. The flexible annular fins bend away from the annular ribs when the temperature of air within the interior of the roller is higher than that of air exterior to the roller, thereby opening the labyrinth seal and allowing heated air within the interior of the roller to escape through the labyrinth seal.

11 Claims, 3 Drawing Sheets

UNIDIRECTIONAL LABYRINTH SEAL

FIELD OF THE INVENTION

This invention relates to labyrinth seals and, more particularly, to annular unidirectional labyrinth seals for idler rollers.

BACKGROUND OF THE INVENTION

In the use of idler rollers it is known to have an idler roller system consisting of a fixed shaft having an idler roller rotatably mounted thereto, with an interposed bearing which facilitates the rotation of the idler roller about the shaft. It is also known to provide labyrinth seals for idler rollers. This combination of idler rollers and labyrinth seals is used, for example, with conveyor belts in mining and other operations. Labyrinth seals employ a tortuous network of passages between the contaminating environment and the idler roller bearing assembly. Contaminants can only infiltrate the bearing assembly by transversing the tortuous path. Idler roller failure is often caused by airborne moisture passing through the labyrinth seals.

During operation the temperature of an idler roller increases, for example, due to friction caused by a conveyor belt moving across the idler roller. This increase in temperature causes air inside the roller to expand and be expelled through the labyrinth seals. Thereafter, when the temperature of the roller decreases, the air inside the idler roller contracts. The air outside the idler roller is then drawn back inside the idler roller through the labyrinth seal. This air that is drawn into the idler roller contains moisture and contaminants which cause corrosion and damage to the bearings and races within the idler roller.

What is needed is a labyrinth seal that will allow air in the interior of the idler roller to exit the idler roller through the labyrinth seal but prevent air exterior to the idler roller from entering the interior of the idler roller through the labyrinth seal.

SUMMARY OF THE INVENTION

The present invention provides a unidirectional annular labyrinth seal component having one or more flexible annular fins positioned on a circular plate near an outer edge of the circular plate. The flexible annular fins are biased towards a center of the circular plate and are constructed to project into recesses formed by one or more annular ribs on an end of a roller, thereby forming a unidirectional annular labyrinth seal. The flexible annular fins are constructed to engage the annular ribs when the temperature of air within an interior of the roller is similar to the temperature of air exterior to the roller, thereby closing a labyrinth inside the labyrinth seal and preventing air exterior to the roller from entering the labyrinth seal and the interior of the roller. The flexible annular fins are also constructed to bend away from the annular ribs when the temperature of air within the interior of the roller is higher than the temperature of air exterior to the roller, thereby opening the labyrinth inside the labyrinth seal and allowing heated air within the interior of the roller to escape through the labyrinth to the air exterior to the idler roller. The circular plate has a central opening constructed to mount the circular plate on a shaft wherein the shaft has a bearing about which the roller rotates.

The present invention further provides a unidirectional annular labyrinth seal comprising one or more flexible annular fins positioned on a circular plate near an outer edge of the circular plate and one or more annular ribs positioned on an end of a roller. The flexible annular fins are constructed to project into recesses formed by the annular ribs, thereby forming the unidirectional annular labyrinth seal.

An advantage of the present invention is a unidirectional labyrinth seal that allows air to flow out of the interior of an idler roller to the exterior of the idler roller but prevents air exterior to the idler roller from entering the interior of the idler roller.

Another advantage is a unidirectional labyrinth seal that protects the bearings and races within the idler roller from corrosion and contamination better than labyrinth seals that are not unidirectional.

Another advantage is a unidirectional labyrinth seal that is durable and easy to maintain and repair.

DETAILED DESCRIPTION OF THE INVENTION

While the following description details the preferred embodiments of the present invention, it is to be understood that the invention is not limited in its application to the details of construction and arrangement of the parts illustrated in the accompanying figures, since the invention is capable of other embodiments and of being practiced in various ways.

Figure 1:
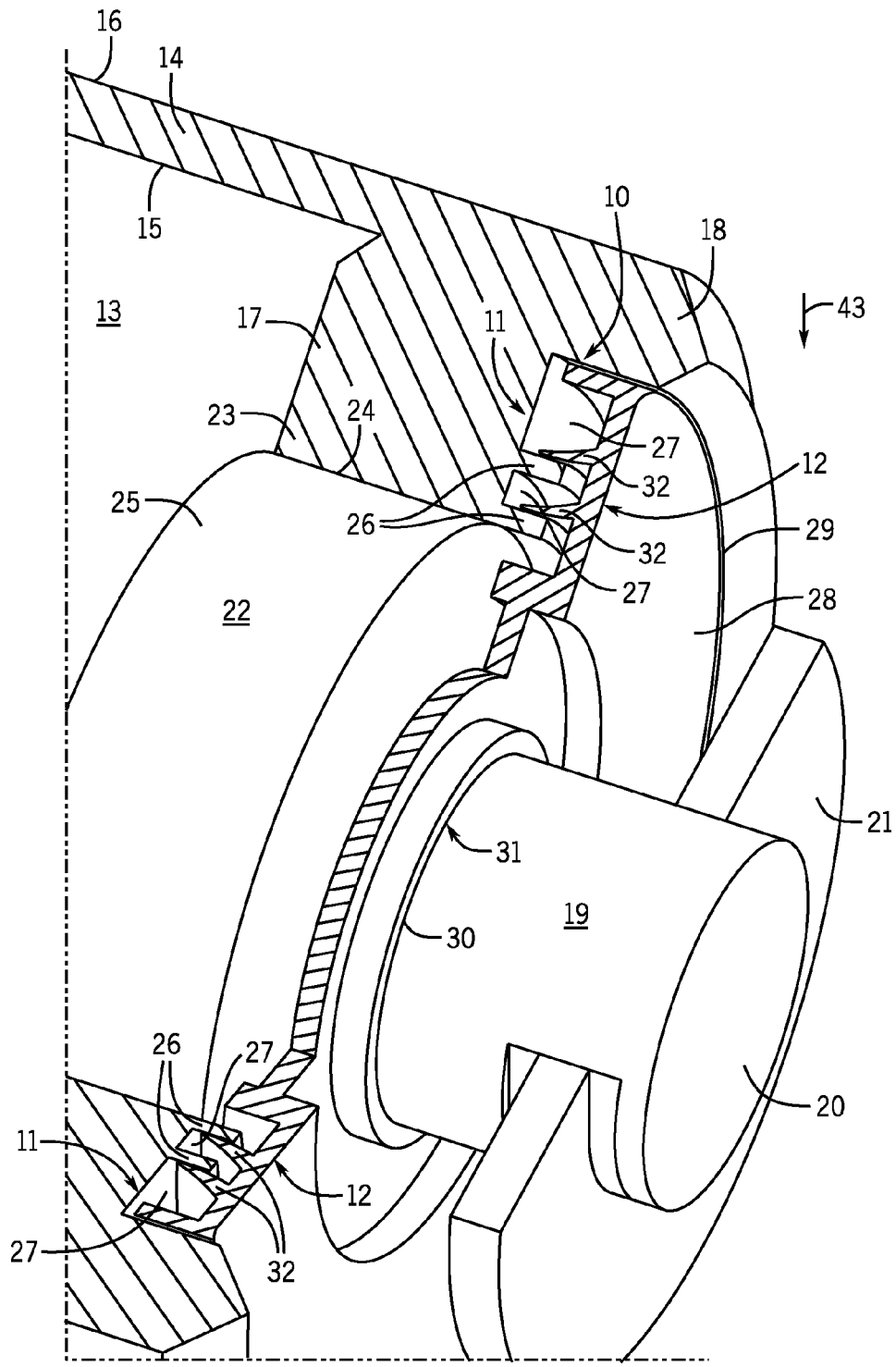
FIG. 1 illustrates a cutaway view of an annular labyrinth seal in an idler roller and bearing assembly of the present invention.

FIG. 1 illustrates a cutaway view of an annular labyrinth seal 10 in an idler roller 14 and bearing 22 assembly. The seal 10 has an inner annular labyrinth seal component 11 and an annular outer labyrinth seal component 12. The seal 10 is located near a first end 18 of roller 14. Roller 14 has an inner surface 15 and an outer surface 16 which define a hollow interior 13 of roller 14. An annular projection 17 extends inwardly from the inner surface 15, near first end 18 of roller 14. Roller 14 is positioned around a shaft 19 near first end 20 of shaft 19. Shaft 19 is fixed to support structure 21 and a bearing 22 is fixed to the shaft 19 so that the shaft 19 does not rotate relative to support structure 21 and bearing 22 does not rotate relative to shaft 19. Annular projection 17 has a distal end 23 having a race 24 which engages the surface 25 of bearing 22 so that roller 14 rotates freely about bearing 22 and shaft 19. Although a second opposite end of roller 14 is not shown, each end of roller 15 will, preferably, have the identical construction. It is, thus, understood that, preferably, the construction of the first end 18 of the roller 14 will be duplicated at the second opposite end of roller 14.

Figure 2:
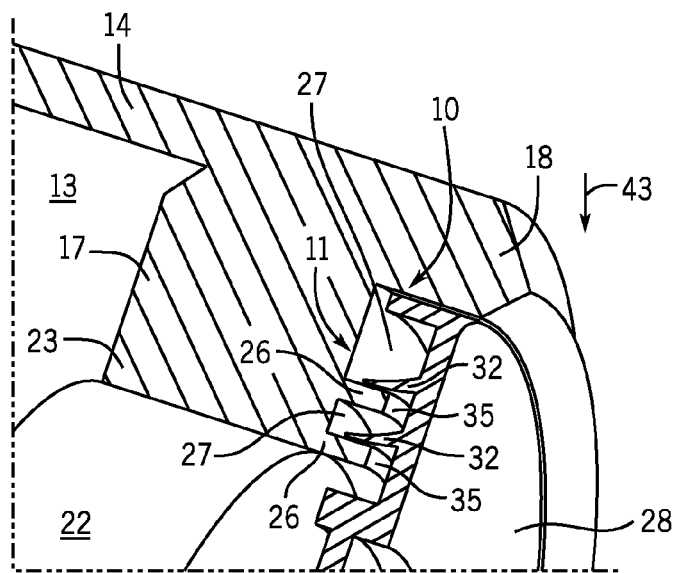
FIG. 2 illustrates that the ribs of an inner seal component may have tapered tips.

The inner seal component 11 has annular ribs 26 projecting therefrom. The ribs 26 form recesses 27. A circular plate 28 is fixed on shaft 19 between the bearing 22 and the first end 20 of shaft 19. The circular plate 28 has an outer edge 29 and an inner edge 30. The inner edge 30 defines an opening 31. The circular plate 28 is positioned on shaft 19 through opening 31. The outer seal component 12 is positioned near the outer edge 29 of the circular plate 28 and has annular fins 32 constructed to project into recesses 27 of the inner seal component 11. The fins 32 are, preferably, tapered and biased towards ribs 26 to make contact with ribs 26, thereby forming a seal. When air within hollow interior 13 of roller 14 is heated and expands, the pressure of the heated air pushes the fins 32 away from the ribs 26 and the heated air can escape to the exterior 43 of the idler roller 14. FIG. 2 illustrates that the ribs 26 may have tapered tips 35 to facilitate assembly of the inner seal component 11 and the outer seal component 12 to form the annular labyrinth seal 10.

Figure 4:
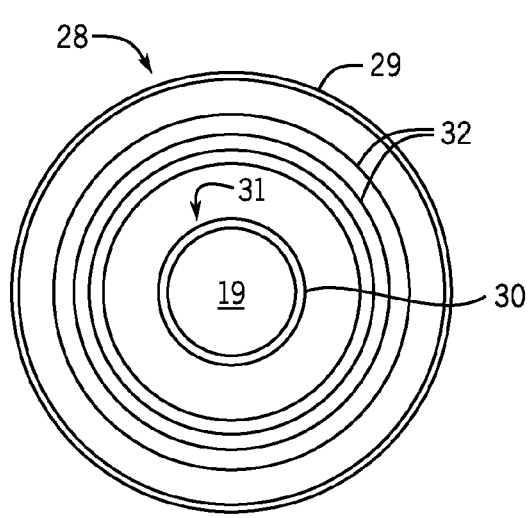
FIG. 4 illustrates a diagram of a front view of an inner surface of the circular plate.
Figure 3:
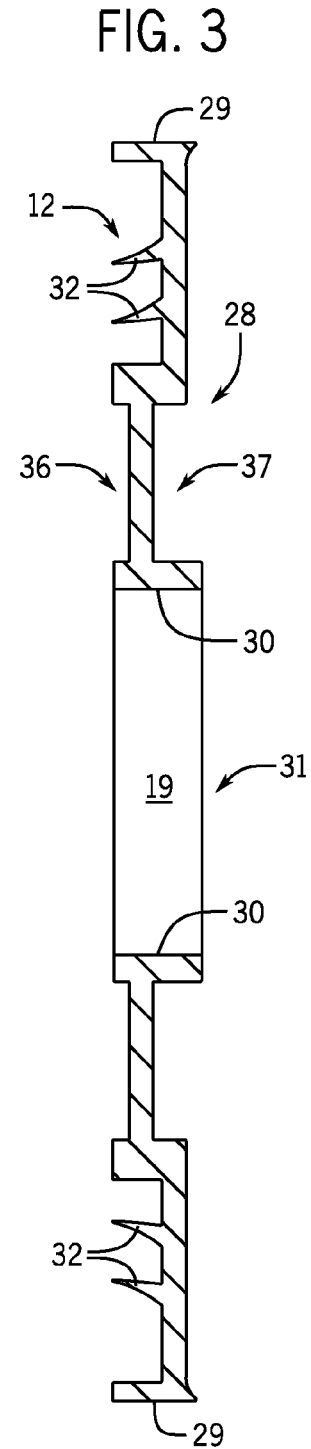
FIG. 3 shows a sectional view of a circular plate that has an outer seal component formed near the outer edge of the circular plate.

FIG. 3 shows a sectional view of circular plate 28, identifying an inner surface 36 and an outer surface 37 of circular plate 28. The inner surface 36 has fins 32 projecting therefrom, forming the annular outer labyrinth seal component 12. Inner surface 36 faces the annular inner labyrinth seal component 11 when the annular labyrinth seal 10 is assembled. FIG. 4 illustrates a front view of the inner surface 36 of circular plate 28.

Figure 5A:
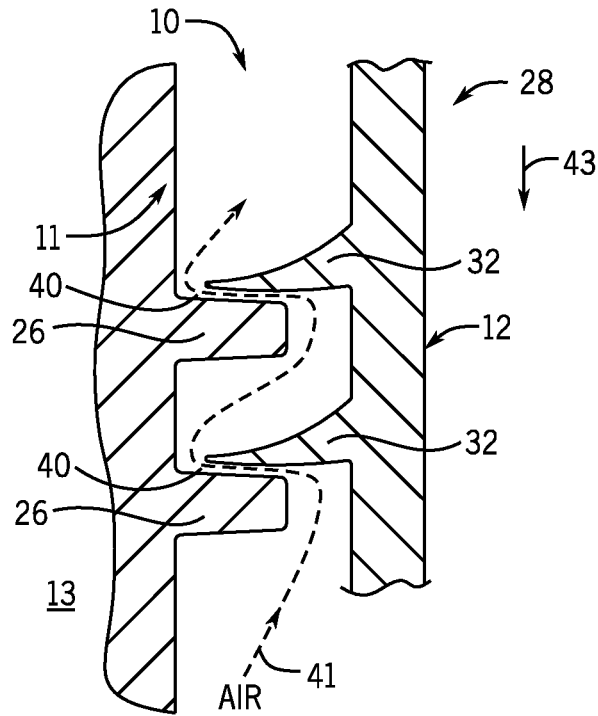
FIGS. 5a and 5b show a sectional view of an annular labyrinth seal in a configuration in which the idler roller is heating up during use and in a configuration when the idler roller is cooling down when not in use.
Figure 5B:
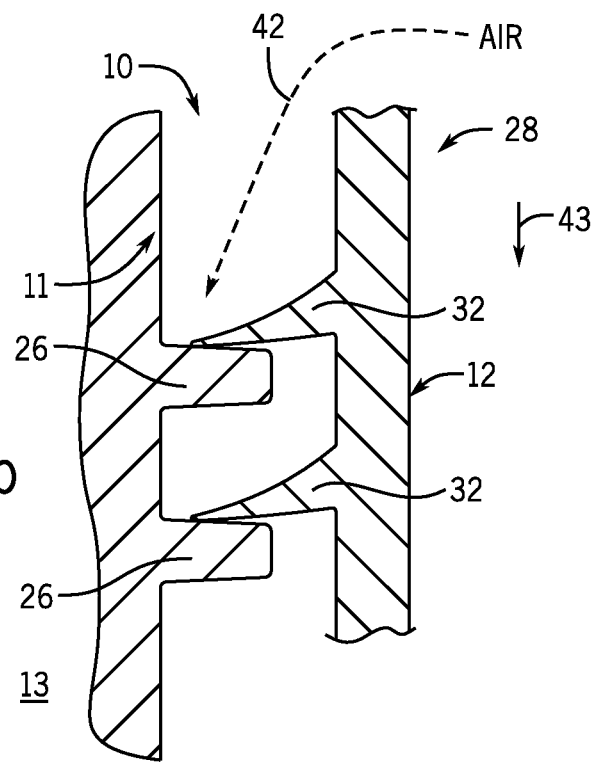

FIG. 5a shows a sectional view of annular labyrinth seal 10 in a configuration in which the idler roller 14 is heating up, for example, by the action of a conveyor belt (not shown). The roller 14 is heated as the conveyor belt moves across the roller 14. There is a gap 40 between the fins 32 and the ribs 26. The gap 40 is created as air within the interior 13 of the roller 14 is heated and expands, exerting pressure on fins 32. Dashed line 41 illustrates heated air moving out of the interior 13 of roller 14 to the exterior 43 of roller 14 along the labyrinth created by the annular ribs 26 and the annular fins 32. FIG. 5b shows a sectional view of annular labyrinth seal 10 in a configuration when the roller 14 is cooling down after the conveyor belt is shut down and not moving across the roller 14. During cooling, the air within the interior 13 of the roller 14 contracts and creates a negative pressure, tending to draw air from the exterior 43 into the annular labyrinth seal 10. This negative pressure allows the fins 32 to bend towards the ribs 26 and make contact with the ribs 26, thereby closing gap 40. Air from the exterior 43 of the idler roller 14 is, thus, prevented from entering the interior 13 of the idler roller 14. This effect prevents moisture and other contaminants in the air from the exterior 43 from entering the roller 14 and prevents corrosion and damage to the roller 14 that can be caused by this moisture and other contaminants in the air from the exterior 43.

The circular plate 28 is made, preferably, of plastic but may also be made of metal, or a combination of metal and plastic. The fins 32 are made of plastic or rubber and may be coated with Teflon™. As noted above, idler pulleys can go through a heating phase during operation and a cooling phase when operation is ended. Fins 32 allow air to escape from the idler roller 14 during the heating phase but will not allow air to pass back into the roller 14 during the cooling phase. In this regard, fins 32 form a unidirectional labyrinth seal 10.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, although two pairs of an annular rib and annular fin are shown, the labyrinth seal may have only one pair of an annular rib and annular fin, or more than two pairs of an annular rib and annular fin. Each annular rib creates an annular recess for receiving an annular fin and there can be one or more annular recesses produce by the one or more annular ribs. Although the ribs and fins are shown as tapered or pointed, they may be of any desired shape and size. The contact between the ribs and fins may be frictionless or near frictionless. The labyrinth seal of the present invention may be used with any type of roller.

It will be understood that various changes in the details, materials, and arrangements of the parts which have been described and illustrated above in order to explain the nature of this invention may be made by those skilled in the art without departing from the principle and scope of the invention as recited in the following claims.

We claim:

1. A unidirectional annular labyrinth seal component, comprising:
   a) one or more flexible annular fins positioned on a circular plate near an outer edge of said circular plate;
   b) said one or more flexible annular fins being biased towards a center of said circular plate;
   c) one or more flexible annular fins being constructed to project into recesses formed by one or more annular ribs on an end of a roller, thereby forming a unidirectional annular labyrinth seal; and
   d) said one or more flexible annular fins being constructed to engage said one or more annular ribs when the temperature of air within an interior of said roller is similar to the temperature of air exterior to said roller, thereby closing a labyrinth inside said labyrinth seal and preventing air exterior to said roller from entering said labyrinth seal and said interior of said roller.

2. A unidirectional annular labyrinth seal component, comprising:
   a) one or more flexible annular fins positioned on a circular plate near an outer edge of said circular plate; and
   b) said one or more flexible annular fins being biased towards a center of said circular plate;
   c) one or more flexible annular fins being constructed to project into recesses formed by one or more annular ribs on an end of a roller, thereby forming a unidirectional annular labyrinth seal;
   d) said one or more flexible annular fins being constructed to bend away from said one or more annular ribs when the temperature of air within said interior of said roller is higher than the temperature of air exterior to said roller, thereby opening said labyrinth inside said labyrinth seal and allowing heated air within said interior of said roller to escape through said labyrinth to the air exterior to said idler roller.

3. The unidirectional annular labyrinth seal component of claim 1, further comprising said circular plate having a central opening constructed to mount said circular plate on a shaft, said shaft having a bearing about which said roller rotates.

4. A unidirectional annular labyrinth seal component, comprising:
   a) one or more flexible annular fins positioned on a circular plate near an outer edge of said circular plate; and
   b) said one or more flexible annular fins being biased towards a center of said circular plate;
   c) said one or more flexible annular fins being constructed to project into recesses formed by one or more annular ribs on an end of a roller, thereby forming a unidirectional annular labyrinth seal;
   d) said one or more flexible annular fins being constructed to engage said one or more annular ribs when the temperature of air within an interior of said roller is similar to the temperature of air exterior to said roller, thereby closing a labyrinth inside said labyrinth seal and preventing air exterior to said roller from entering said labyrinth seal and said interior of said roller; and e) said one or more flexible annular fins being constructed to bend away from said one or more annular ribs when the temperature of air within said interior of said roller is higher than the temperature of air exterior to said roller, thereby opening said labyrinth inside said labyrinth seal and allowing heated air within said interior of said roller to escape through said labyrinth to the air exterior to said idler roller.

5. The unidirectional annular labyrinth seal component of claim 4, further comprising said circular plate having a central opening constructed to mount said circular plate on a shaft, said shaft having a bearing about which said roller rotates.

6. A unidirectional annular labyrinth seal, comprising:
a) one or more flexible annular fins positioned on a circular plate near an outer edge of said circular plate;
b) said one or more flexible annular fins being biased towards a center of said circular plate; and
c) one or more annular ribs positioned on an end of a roller, said one or more flexible annular fins being constructed to project into recesses formed by said one or more annular ribs, thereby forming said unidirectional annular labyrinth seal.

7. The unidirectional annular labyrinth seal of claim 6, further comprising said one or more flexible annular fins being constructed to engage said one or more annular ribs when the temperature of air within an interior of said roller is similar to the temperature of air exterior to said roller, thereby closing a labyrinth inside said labyrinth seal and preventing air exterior to said roller from entering said labyrinth seal and said interior of said roller.

8. The unidirectional annular labyrinth seal of claim 6, further comprising said one or more flexible annular fins being constructed to bend away from said one or more annular ribs when the temperature of air within said interior of said roller is higher than the temperature of air exterior to said roller, thereby opening said labyrinth inside said labyrinth seal and allowing heated air within said interior of said roller to escape through said labyrinth to the air exterior to said idler roller.

9. The unidirectional annular labyrinth seal of claim 6, further comprising said circular plate having a central opening constructed to mount said circular plate on a shaft, said shaft having a bearing about which said roller rotates.

10. A unidirectional annular labyrinth seal, comprising:
a) one or more flexible annular fins positioned on a circular plate near an outer edge of said circular plate;
b) said one or more flexible annular fins being biased towards a center of said circular plate;
c) one or more annular ribs positioned on an end of a roller, said one or more flexible annular fins being constructed to project into recesses formed by said one or more annular ribs, thereby forming said unidirectional annular labyrinth seal;
d) said one or more flexible annular fins being constructed to engage said one or more annular ribs when the temperature of air within an interior of said roller is similar to the temperature of air exterior to said roller, thereby closing a labyrinth inside said labyrinth seal and preventing air exterior to said roller from entering said labyrinth seal and said interior of said roller; and
e) said one or more flexible annular fins being constructed to bend away from said one or more annular ribs when the temperature of air within said interior of said roller is higher than the temperature of air exterior to said roller, thereby opening said labyrinth inside said labyrinth seal and allowing heated air within said interior of said roller to escape through said labyrinth to the air exterior to said idler roller.

11. The unidirectional annular labyrinth seal of claim 10, further comprising said circular plate having a central opening constructed to mount said circular plate on a shaft, said shaft having a bearing about which said roller rotates.

\* \* \* \* \*